(12) United States Patent (10) Patent No.: US 8,793,240 B2
Potapov et al. (45) Date of Patent: Jul. 29, 2014

(54) GENERATION OF MACHINE CODE FOR A DATABASE STATEMENT BY SPECIALIZATION OF INTERPRETER CODE

(75) Inventors: Dmitry M. Potapov, Redwood City, CA (US); Dmitri Bronnikov, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 209 days.

(21) Appl. No.: 13/219,574

(22) Filed: Aug. 26, 2011

(65) Prior Publication Data

US 2013/0054649 A1 Feb. 28, 2013

(51) Int. Cl.
*G06F 17/30* (2006.01)
*G06F 7/00* (2006.01)

(52) U.S. Cl.
USPC ........... 707/713; 707/759; 707/769; 707/792; 717/138

(58) Field of Classification Search
None
See application file for complete search history.

(56) References Cited

U.S. PATENT DOCUMENTS

| | | | |
|---|---|---|---|
| 6,327,702 B1 * | 12/2001 | Sauntry et al. | 717/118 |
| 7,185,003 B2 * | 2/2007 | Bayliss et al. | 1/1 |
| 7,536,682 B2 * | 5/2009 | Dankel et al. | 717/139 |
| 7,779,020 B2 * | 8/2010 | Grust et al. | 707/760 |
| 8,112,443 B2 * | 2/2012 | Hutchison et al. | 707/782 |
| 8,177,018 B2 * | 5/2012 | Coleman et al. | 180/444 |
| 2007/0118832 A1 * | 5/2007 | Huelsbergen | 717/151 |
| 2008/0010296 A1 * | 1/2008 | Bayliss et al. | 707/10 |
| 2011/0016459 A1 * | 1/2011 | Meyers et al. | 717/139 |
| 2012/0030659 A1 * | 2/2012 | Porras et al. | 717/151 |

OTHER PUBLICATIONS

Andersen, L. O., "C Program Specialization", Master's Thesis, DIKU, Department of Computer Science, University of Copenhagen, Denmark, May 1992, pp. 162.
Andersen, L. O., "Partial Evaluation of C and Automatic Compiler Generation", DIKU, Department of University of Copenhagen, Denmark, published in Lecture Notes in Computer Science, 1992, vol. 641, pp. 7.
Daytona, printed out from http://www2.research.att.com/~daytona/, Aug. 16, 2011, p. 1.
Beckmann, O. "Partial Evaluation, Imperative Languages and C", Mar. 1996, pp. 16.
Consel, C. et al., "Tutorial Notes on Partial Evaluation", Jan. 1993, (Revision, Oct. 28, 1992), pp. 9.

(Continued)

*Primary Examiner* — Robert Beausoliel, Jr.
*Assistant Examiner* — Susan F Rayyan
(74) *Attorney, Agent, or Firm* — Silicon Valley Patent Group LLP; Omkar K. Suryadevara

(57) ABSTRACT

After receipt of an instruction (e.g. a database statement), one or more computers specialize an interpreter with the received instruction as constant, to obtain a specialized interpreter that is stored in memory and/or disk. The specialized interpreter is then invoked to execute the received instruction. Depending on the embodiment, the interpreter being specialized may additionally be received and used in binary form without specialization. Specifically, in some embodiments, an identical interpreter is received in two forms: in a binary language specific to the one or more computers and also in a language that is acceptable to a specializer, such as a source language or an intermediate language. The interpreter in the binary language is invoked by default unless a predetermined condition for specialization is met. When the predetermined condition is met, the interpreter in the specializer-acceptable language is specialized by the specializer, and then the specialized interpreter is invoked.

20 Claims, 12 Drawing Sheets

(56) References Cited

OTHER PUBLICATIONS

Daytona, printed out from http://www2.research.att.com/~daytona/inuse.php_8/, Aug. 16, 2011, pp. 2.

Recent Features Added to Daytona, printed out from http://www2.research.att.com/~daytona/nufeatures.php, Aug. 16, 2011, pp. 5.

Futamura, Y. et al., "Program Transformation System Based on Generalized Partial Computation", New Generation Computing, (20), 2002, pp. 25.

Futamura, Y. "Partial Evaluation of Computation Process—An Approach to a Compiler-Compiler", Higher-Order and Symbolic Computation 12, 1999, pp. 11.

Makholm, H., "Specializing C an introduction to the principles behind C-Mix/II", Jun. 1999, pp. 156.

Oracle® Database Concepts, 11g Release 2 (11.2), E16508-05, Oct. 2010, pp. 454.

Jones, N. D. et al., "Partial Evaluation and Automatic Program Generation", originally published 1993, pp. 425.

Andersen, L. O., "Program Analysis and Specialization for the C Programming Language", Ph.D. Thesis, DIKU, University of Copenhagen, Denmark, May 1994, pp. 311.

Andersson, R., "SQL-compiler, Master thesis in Computing Science", Mar. 1998, pp. 41.

Ruf, E., "Topics in Online Partial Evaluation", Computer Systems Laboratory, Department of Electrical Engineering & Computer Science, Stanford University, California, Mar. 1993, pp. 366.

Surati, R. "Practical Partial Evaluation", Massachusetts Institute of Technology, May 1995, pp. 43.

Greer, R. "Using Daytona on Network Data: Three Paradigms", AT&T Research, May 31, 2002, pp. 26.

Whaley, J. "Dynamic Optimization through the use of Automatic Runtime Specialization", Massachusetts Institute of Technology, May 1999, pp. 114.

\* cited by examiner

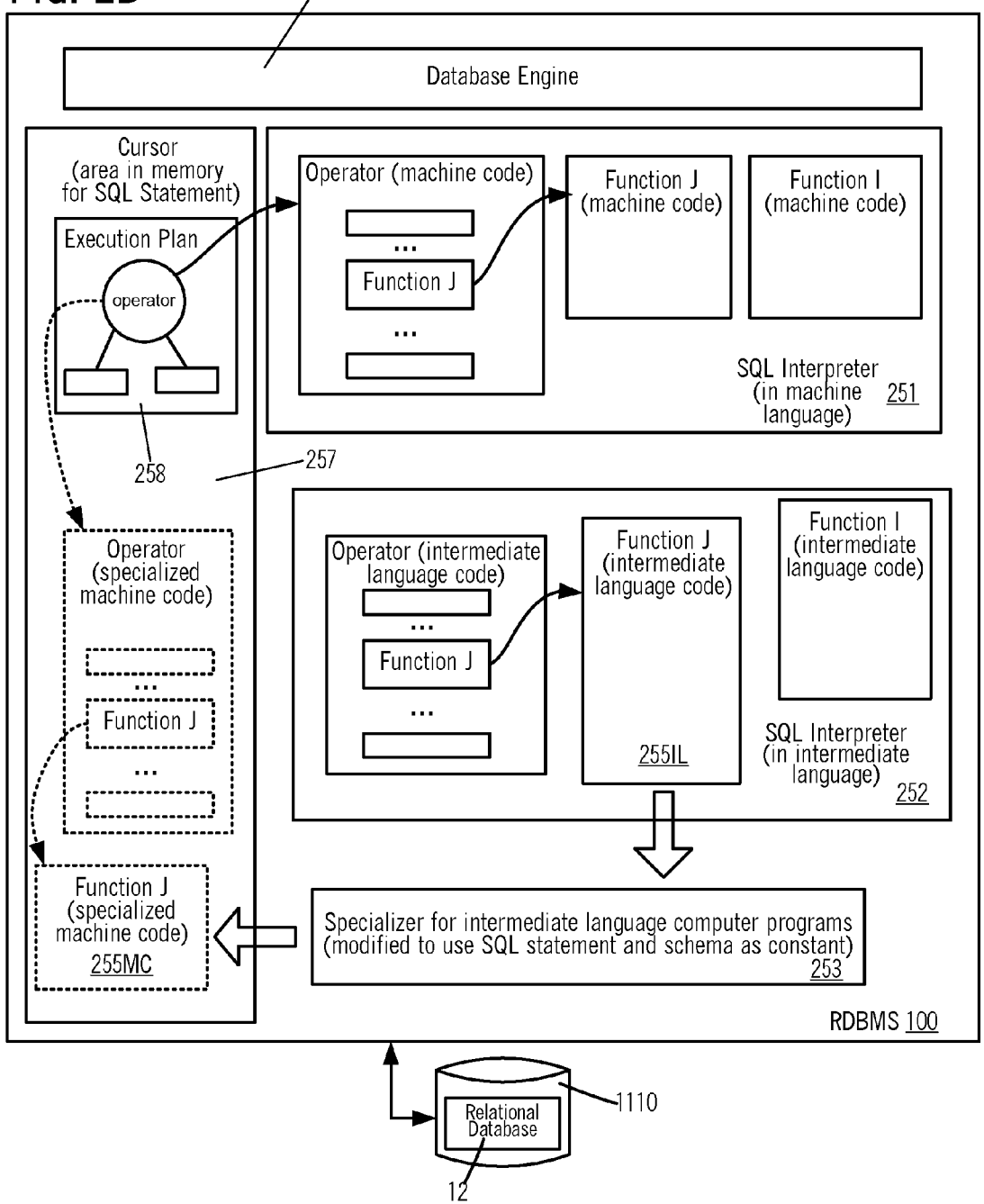

```
SELECT Price+Tax-Discount+Shipping
FROM Sales
```
FIG. 4A (prior art)
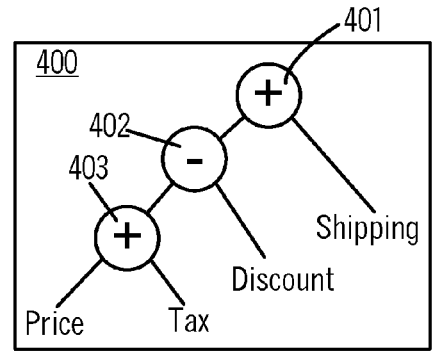
FIG. 4B (prior art)
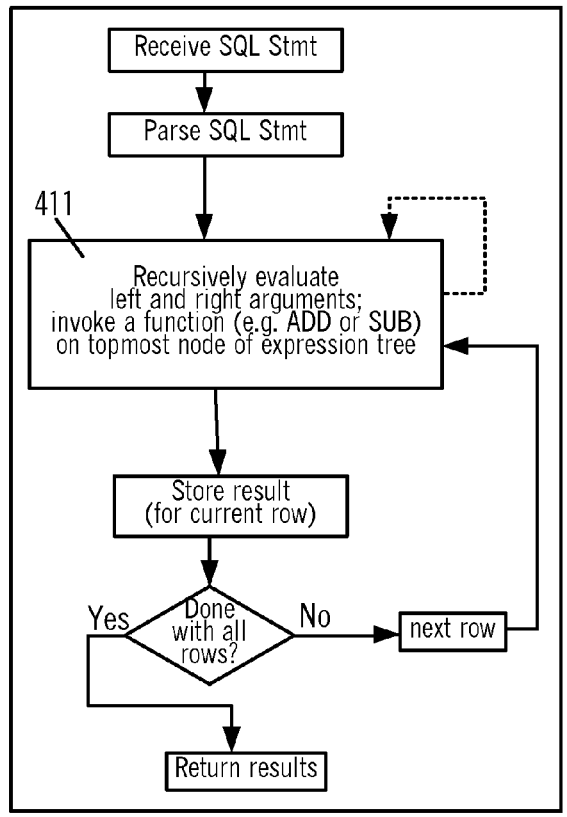
FIG. 4C (prior art)

```
CREATE TABLE Sales (
    Receipt_no integer NOT NULL,
    Subtotal number NOT NULL,
Tax number NOT NULL,
Discount number,
Shipping number NOT NULL
)
```

FIG. 4F (prior art)

```
SELECT Price+Tax-Discount+Shipping
FROM Sales
WHERE Price is NOT NULL
AND Tax is NOT NULL
AND Discount is NOT NULL
AND Shipping is NOT NULL
```

FIG. 4G (prior art)

```
SELECT * FROM Employee
ORDER BY Hire_Date, Salary
WHERE Hire_Date is NOT NULL
AND Salary is NOT NULL
```

GENERATION OF MACHINE CODE FOR A DATABASE STATEMENT BY SPECIALIZATION OF INTERPRETER CODE

BACKGROUND

Two major types of Programming Language Runtimes are created by interpreters and compilers. Interpreters usually execute a software program slower than compilers due to translation of source code expressed in a high-level computer language into machine code (also called "object code" or "native code"), one instruction at a time, during execution of the software program in a computer ("run-time computer"). On the other hand, compilers can generate machine executable native code from source code ahead of time (AOT), typically in a different computer ("build computer"). Compilers are typically more complicated to develop and support than interpreters, but compiler-generated object code can execute faster than interpretation of source code in a procedural language.

Structured query language (SQL) is a declarative language which is not procedural. Statements (also called queries) written in SQL describe what should be done, without describing how a relational database should be accessed. Hence, in prior art, database statements expressed in SQL are typically received and then interpreted by run-time computers ("database servers"), instead of being compiled ahead of time in a build computer that generates machine code of a relational database management systems (RDBMS). During interpretation, an engine in the RDBMS executing in a database server that receives an SQL statement, parses the SQL statement, i.e. does so at database run time.

A parsed SQL statement and associated information (such as bind variable values) may be stored in a private SQL area (also called "cursor") in a memory of the database server, e.g. as described in Chapter 14 entitled "Memory Architecture" of the book Oracle® Database Concepts, 11g, Release 2 (11.2), published October 2010, E16508-05 that is incorporated by reference herein in its entirety. The RDBMS engine then prepares the parsed SQL statement for execution, by creating a plan ("execution plan") to allocate local resources (such as buffers and registers). Such an execution plan may also be stored in the just-described cursor ("database cursor"), and used by the RDBMS engine, to execute the SQL statement in the database server. A database cursor may hold information identifying one or more sequences of machine code in the RDBMS engine (such as a function for expression evaluation or another function for key comparison). The one or more sequences of machine code which are identified in a specific database cursor are portions of the RDBMS, also identified (and shared) in execution plans of other database cursors for other database statement(s).

Creation and execution of an execution plan at database run time enables a database server to process any new SQL statement that is dynamically received. Such flexibility in processing any SQL statement imposes a performance penalty in the database server, because each SQL statement must be parsed in the database server after its receipt, and only then executed. The performance penalty can be reduced by re-using an execution plan of a parsed SQL statement (in the database cursor), to process any subsequent occurrences of that same SQL statement when identical SQL statements are issued by multiple users and/or applications.

A parsed SQL statement in an execution plan in a cursor is normally executed by an SQL interpreter which incurs overhead ("interpretive overhead"). Although a compiler can generate machine code that lacks interpretive overhead, the SQL statement to be executed is not known until database run time. Compilation of a SQL statement to machine code after the SQL statement is received imposes its own penalty, which can reduce system throughput.

To the knowledge of the inventors of the current patent application, the prior art does not appear to disclose or render obvious the inventors' generation of machine code for a database statement by specialization of interpreter code, as follows.

SUMMARY

One or more computers ("database servers") are programmed in accordance with the invention to specialize code of an interpreter of a database management system (DBMS), using as constant (a) a statement ("database statement") to perform an operation on a database and/or (b) schema of the database. The interpreter's specialization results in machine code of a specialized interpreter being created locally i.e. within the database server(s). The specialized interpreter is then invoked, to execute the database statement in the database management system. In several embodiments, on receipt of the database statement from a client computer, a check is made, as to whether the specialized interpreter is present in the one or more computers, and when the result of checking is false, the interpreter is specialized as described above.

Depending on the embodiment, the interpreter being specialized may alternatively be used in a binary form without specialization, by executing it directly, to interpret the database statement in the normal manner. Accordingly, in some embodiments, a single DBMS interpreter is stored and used in one or more database server(s), in two forms as follows. A first form of the DBMS interpreter is machine code that is expressed in a binary language directly executable by hardware, such as processors or a central processing unit (CPU) in the database server(s). A second form of the DBMS interpreter may be expressed in any language for which a specializer is present in the one or more database server(s), e.g. a human-understandable programming language (such as "C" language) or an intermediate language (IL).

In certain embodiments, such database server(s) automatically respond to receipt of a database statement from a client computer, by using the DBMS interpreter in the first form (e.g. in the binary language) by default unless a predetermined condition for specialization is met. When the predetermined condition is met, the database server(s) automatically use the received database statement and/or database schema to specialize the DBMS interpreter in the second form, resulting in locally-created machine code, which is then executed in the database server(s) in executing the received database statement.

In several such embodiments, a specializer in binary form may be bundled, together with two forms of the same DBMS interpreter, in a single package that is distributed as a database management system (DBMS). Specifically, the just-described package including a specializer and two forms of DMBS interpreter may be made available by a computer ("build computer"), for download into database server(s), for installation therein.

BRIEF DESCRIPTION OF THE FIGURES

FIG. 2B illustrates, in a high level block diagram, a cursor of a database statement, and code of an SQL interpreter in two forms (in machine language and in an intermediate language), a specializer (for the intermediate language), and a database engine in a relational database management system (RDBMS) of several embodiments.

FIGS. 4A and 4B illustrate two forms of an SQL statement of the prior art.

FIG. 4C illustrates, in a flow chart, execution of the SQL statement of FIGS. 4A and 4B using an SQL interpreter of the prior art.

FIG. 4F illustrates an SQL statement, to create a table in a relational database of the prior art.

FIG. 4G illustrates another SQL statement, to retrieve data from a relational database of the prior art.

DETAILED DESCRIPTION

Figure 1:
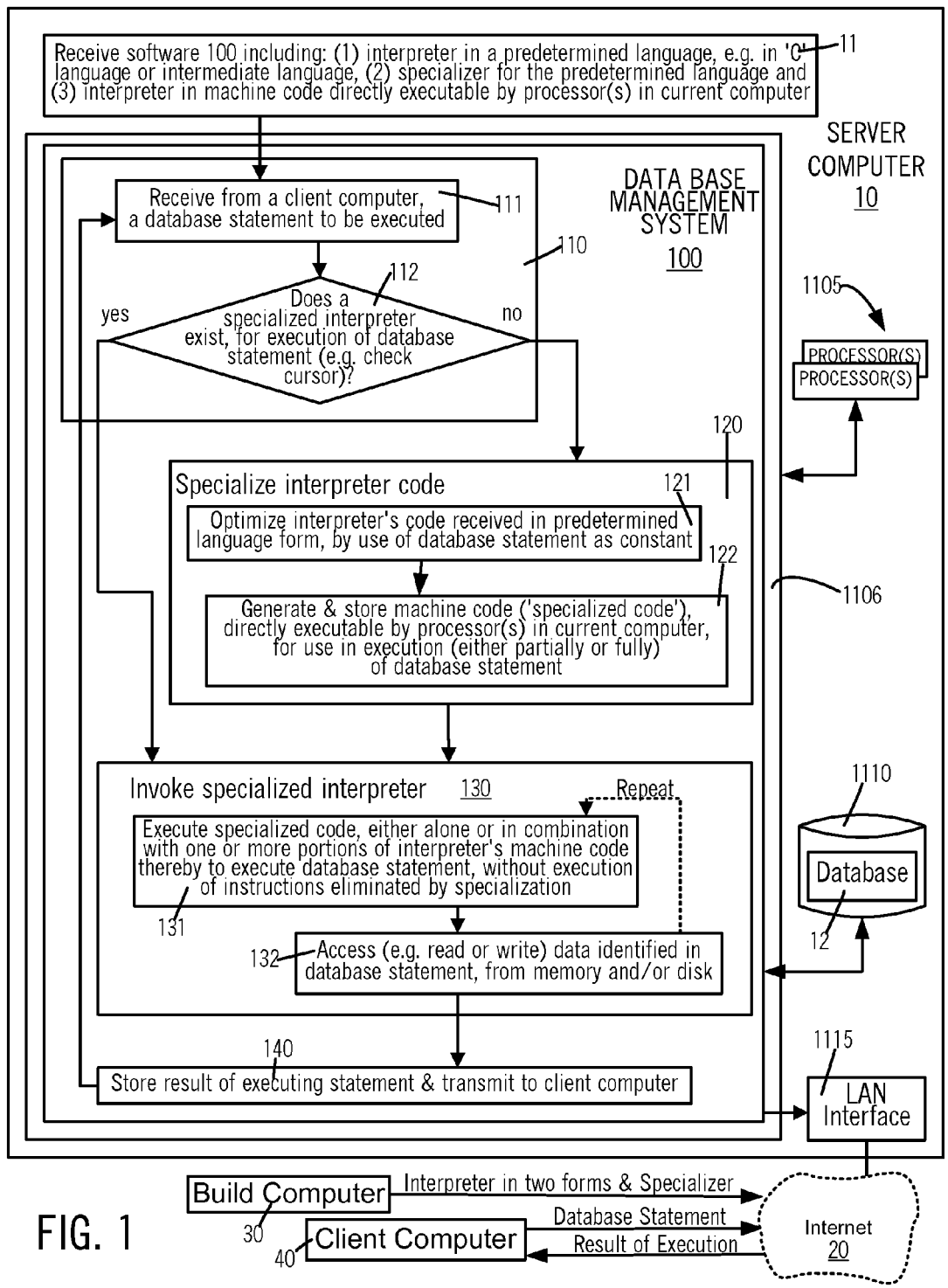
FIG. 1 illustrates, a method performed by one or more processors 1105 in a computer 10, in accordance with the invention, to generate machine code for a database statement by specialization of interpreter code.

A problem of generating machine code for a database statement is solved in accordance with the invention, by applying the First Futamura Projection to an existing database interpreter, and removing one or more interpretive overheads therein. Accordingly, one or more computers are programmed in accordance with the invention to specialize at database runtime for any given SQL statement, an existing SQL interpreter that is normally used to interpret the SQL statement. Similar techniques used in other embodiments in accordance with the invention are also referred to as Partial Evaluation and Program/Algorithm Specialization. Partial evaluation of an SQL interpreter with a given SQL statement as constant in accordance with the invention can provide machine code for the SQL statement that runs faster than the SQL interpreter.

A First Futamura Projection used in accordance with the invention is a known technique, e.g. see http://en.wikipedia.org/wiki/Futamura_projection. See the paper by Yoshihiko Futamura entitled "Partial Evaluation of Computation Process—An Approach to a Compiler-Compiler", published in Higher-Order and Symbolic Computation 12, 381-391 (1999), and available at http://www.brics.dk/~hosc/local/HOSC-12-4-pp381-391.pdf which is incorporated by reference herein in its entirety. For additional information, see the book entitled "Partial Evaluation and Automatic Program Generation" by Neil D. Jones, Carsten K. Gomard and Peter Sestoft, 1999 and available at http://www.dina.kvl.dk/~sestoft/pebook/pebook.html which is incorporated by reference herein in its entirety. In section 1.4.1, on page 12, this book states "when given a language definition in the form of an operational semantics, a partial evaluator eliminates the first and largest order of magnitude: the interpretation overhead. A virtue is that the method yields target programs that are always correct with respect to the interpreter. Thus the problem of compiler correctness seems to have vanished." The just-quoted text appears to be related to prototype implementation of new languages from interpretive definitions (known as metaprogramming in the Prolog community). The current inventors are not aware of any information related to successfully applying the techniques described in this paragraph, to database interpreters, and more specifically to SQL interpreters.

Accordingly, one or more processors in a computer 10 is/are programmed in accordance with the invention to perform a method of the type illustrated in FIG. 1 as follows. Specifically, in an operation 11, a computer 10 receives three pieces of software as follows: (1) an interpreter in a predetermined language which may be either a source language, such as C language, or an intermediate language that is internal to a vendor of the software, (2) a specializer for the predetermined language, expressed in machine code (binary code or object code) in an instruction set architecture (ISA) of one or more processors 1105 in computer 10, and (3) the same interpreter in machine code. The just-described three pieces of software may be included in a database management system 100 (or more generally any application software 100), which after receipt in operation 11 is subsequently executed by computer 10 as described below in reference to operations 110-140.

Computer 10 is typically a run-time computer that is operated by an enterprise (such as an automobile manufacturer) that receives the above-described software 100 in the operation 11, via a local area network (LAN) interface 1115 in computer 10. LAN interface 1115 is typically coupled via Internet 20 to a build computer 30 of a software vendor that supplies software 100 to the enterprise for use in computer 10 (also called "server computer" 10). LAN interface 1115 is also coupled by Internet 20 to a client computer 40 that transmits a database statement (or instruction to an application) to server computer 10 for execution therein. Accordingly, in due course, client computer 40 receives a result of execution of the database statement (or other such instruction) back from computer 10, via LAN interface 1115 and Internet 20, in a normal manner.

Computer 10 executes database management system 100 (or more generally any application software 100) as follows. In response to receipt of the database statement (or other such instruction) in an act 111 of operation 110, computer 10 of some embodiments checks, in act 112, whether a specialized interpreter already exists for use in execution of the database statement (e.g. by checking a cursor). In a first iteration in response to the database statement (or other such instruction)

being received, there is no such specialized interpreter in computer 10 (for the received database statement), and so the no branch is taken out of act 112 and operation 120 is performed to specialize the predetermined language code of the interpreter received in act 11. Subsequent occurrences of this same database statement re-use the specialized code generated and stored by operation 120, and therefore the yes branch is taken out of act 112 and operation 120 is skipped as described below.

Operation 120 is implemented differently in different embodiments, although implementation in certain illustrative embodiments is shown by acts 121 and 122 in FIG. 1. Specifically, in act 121, computer 10 optimizes the code of the interpreter (in the predetermined language form) by use of the database statement as constant, and then in act 122, computer 10 generates and stores to memory 1106 (and/or to storage device 1110), machine code in conformance with the instruction set architecture (ISA) of one or more processors 1105A, 1105B. As noted at the end of the previous paragraph, it is this machine code (which is stored in act 122) that is checked in future iterations of act 112 (for the same database statement) and on being found to be present in computer 10, the yes branch is taken from act 112 to operation 130.

Operation 120 is followed by operation 130 wherein the machine code generated by interpreter specialization (as per operation 120) is invoked, and gets executed during execution of the received database statement. Therefore, results of operation 130 are stored to memory 1106 as per act 140 and then transmitted to client computer 40 (also in act 140). Operation 130 is implemented differently in different embodiments, although implementation in certain illustrative embodiments is shown in FIG. 1 by acts 131 and 132 as follows.

Specifically, in act 131, computer 10 executes the specialized code generated by act 122 (described above) either alone or in combination with one or more portions of the interpreter's machine code, thereby to execute the received database statement. During such execution in act 131, as specialized code of the interpreter is executed, one or more operations that were eliminated during optimization in act 121 (using the database statement as constant) are not performed in act 131. Thereafter, in act 132, access is made to memory and/or disk to read and/or write data identified by execution of the received database statement. Note that in some embodiments, not all the data is accessed in act 132, and instead control returns to act 131 and one or more parts of this act 131 are therefore repeated, followed by repetition of act 132, until all the data that is needed is accessed, as per execution of the received database statement.

Use of an identical DBMS interpreter in two forms by database server(s) 10 as noted above in reference to FIG. 1 has several advantages as follows. Firstly, results of execution of a database statement are guaranteed to be identical regardless of which one of the two forms of the interpreter is used, thus eliminating the need to prove identity of execution results. Secondly, database server(s) 10 are programmed in some embodiments to receive and implement a command from a user identifying a specific one of two modes of operation of the DBMS to be enabled and/or disabled, e.g. some users may command the use of only the DBMS interpreter received in binary form (i.e. disable creation and use of specialized interpreters) to maintain backward compatibility in database performance, and/or to work around a critical issue.

Thirdly, in some embodiments, both modes of operation of the DBMS interpreter are enabled, and the database servers 10 are programmed to automatically select whichever mode is likely to provide better performance, e.g. based on use of predetermined criteria (e.g. by applying heuristics). Fourthly, a vendor of the DBMS interpreter (in the two forms) may initially support use of specialized interpreters with only certain database statements (e.g. for only an initial set of database queries) followed by additional support for additional instructions (e.g. a larger set of database queries including the initial set), so as to rollout support for specialized interpreters incrementally.

Figure 2A:
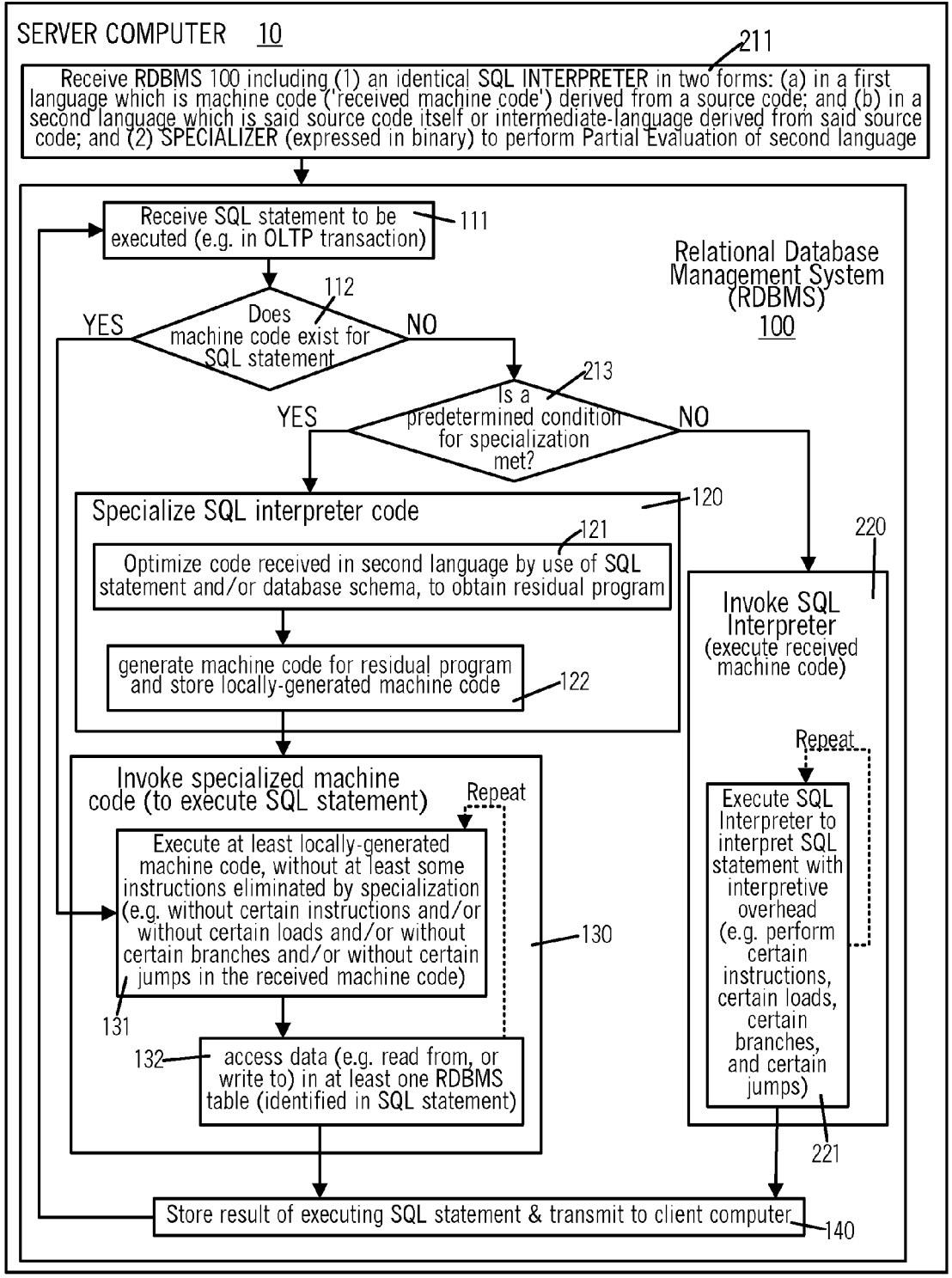
FIG. 2A illustrates a method similar to the method of FIG. 1, shown with additional acts 213 and 220 performed by computer 10 in some embodiments of the invention, and with additional detail to implement a relational database management system (RDBMS).

Fifthly, in certain embodiments wherein both language versions received in act 11 are derived (directly or indirectly) from a common interpreter, e.g. expressed in a source language, a database statement that is used as constant in specialization in operation 120 can be expressed in a declarative language, such as SQL, to support operations at a higher level of abstraction than in a procedural language. Accordingly, in certain illustrative embodiments, operations 110-140 are performed by a database management system 100 that is relational as shown in FIG. 2A although any non-relational database management system 100 (e.g. a hierarchical database management system) may also be implemented in a similar manner, as discussed generically in reference to FIG. 1. An example of a relational DBMS 100 that can be used as shown in FIG. 2A, is ORACLE Database, version 11g Release 2, available from Oracle Corporation.

Many of the acts and operations in FIG. 2A are similar or identical to corresponding acts and operations of FIG. 1, unless otherwise described herein. In some embodiments of the type illustrated in FIG. 2A, during performance of act 132 (by execution of locally-generated machine code) and during performance of act 221 (by execution of received machine code), data is accessed from a table identified in the SQL statement, that is one of multiple tables in a relational database 12 (FIG. 2B). Each table among the multiple tables of relational database 12 includes a plurality of columns that identify a corresponding plurality of attributes, and each table includes multiple rows with each row therein being uniquely identified by a primary key attribute. In a group of such tables, at least one row in each table may be related by a foreign key attribute to another row in another table in the group.

In some embodiments, a relational DBMS 100 received in act 211 (FIG. 2A) includes an identical SQL interpreter in two forms, namely (a) in a first language which is machine language (e.g. software 251 in FIG. 2B) that is platform specific and derived from a source code and (b) in a second language also derived from the same source code but expressed either in the language of that source code (e.g. C language) or in an intermediate language (e.g. software 252 in FIG. 2B). Several functions I, J that are present in machine language software 251 are also present in intermediate language software 252.

The just-described functions are used by one or more operators in machine language software 251, and corresponding operators may be present in intermediate language software 252 for use in interpreter specialization in operation 120 (FIG. 2A). A function J in intermediate language software 252 (see 255IL in FIG. 2B) may be specialized by a specializer 253 (expressed in the platform-specific machine code) with the SQL statement as constant, resulting in the same function J in machine code form (see 255MC). Function J's machine code form 255MC (FIG. 2B) resulting from specialization can be stored in a cursor 257 for the SQL statement received in act 111, as shown in FIG. 2A. Cursor 257 may also be used to store a machine code form of an operator that invokes function J (with or without SQL specialization of the operator). Cursor 257 typically also holds an execution plan 258 that in turn contains one or more operators (not labeled).

Relational DBMS 100 may also include a database engine 259 that invokes one or more of the operators and/or functions.

When execution of RDBMS 100 begins, in act 111 an instruction to be executed by software 100 (see FIG. 2A) is received in the form of an SQL statement 195. The SQL statement 195 (FIG. 3A) may be part of, for example, an OLTP transaction and may include one or more subqueries in the normal manner (e.g. in a WHERE clause). Next, in act 112 (FIG. 2A), server computer (also called database server) 10 checks whether machine code for use in execution of the SQL statement already exists in memory 1106 and if so control transfers to act 131. But, if in act 112 the answer is no, then computer 10 goes to act 213. In act 213, computer 10 checks if a predetermined condition has been met, for specialization of the SQL interpreter expressed in the second language (using as constant the SQL statement and/or database schema).

The predetermined condition checked in act 213 may be different in different embodiments and this condition is not a critical aspect of some embodiments. For example, a predetermined condition may be selected in some embodiments to avoid unnecessary generation of machine code, e.g. interpreter specialization for SQL statements that are unlikely to re-occur in future, and/or that are estimated to have too few rows to justify the cost.

When the result of act 213 is no, an operation 220 is performed by computer 10, by invoking the SQL interpreter. Therefore, in act 221, a form of SQL interpreter that is invoked is the form expressed in the machine code received in act 211. Therefore, during performance of act 221, the SQL interpreter incurs the overhead built into the machine code received in act 211 (described above). For example, on a first occurrence of the SQL statement, the predetermined condition tested in act 213 may not be met, and therefore computer 10 takes the no branch from act 213 and goes to operation 220. In operation 220, computer 10 incurs overhead by performing certain instructions, certain loads, certain branches, and certain jumps included in the received machine code of the SQL interpreter. To re-iterate, the SQL interpreter executes act 221 in the normal manner, including any built-in overhead. After performance of act 221, computer 10 performs act 140 (as described above).

When the result of act 213 is yes (e.g. on a second occurrence of the SQL statement), the above-described operations 120 and 130 are performed by computer 10 (FIG. 2A). Specifically, act 121 is performed in the above-described manner, to optimize the SQL interpreter expressed in the second language received in act 211. The second language is predetermined to be either same as the language of the source code (e.g. C language) or an intermediate language (IL), depending on the embodiment. Note that the second language can be any language that is acceptable to a specializer 253 (FIG. 2B) that is included in or accessible to server computer 10.

In some embodiments, the second language is an intermediate language (IL) and the corresponding SQL interpreter code received in act 211 is derived by a build computer 20 from a source code in the C language that is also used therein to generate the SQL interpreter expressed in the first language ("machine language"). Creation of IL code for the SQL interpreter by build computer 30 eliminates the need for a C compiler to be present in server computer 10. Moreover, use of IL code for the SQL interpreter eliminates understandability (i.e. transparency) of the SQL interpreter by a human who may access a transmission of the C language version of SQL interpreter from build computer 30 to run-time computer 10.

Depending on the embodiment, IL code for the SQL interpreter may be loaded into a dictionary table and/or system tablespace of a database at database creation time. The IL may be made loadable by a key value (e.g, function name: "key-compare"). Alternative embodiments may directly embed IL code for the SQL interpreter into an executable for the RDBMS, e.g. in a form of a C const byte array. The specific format in which the IL code is made available to server computer 10 is not an important aspect of the invention. Moreover, a specific format and grammar of the intermediate language (IL) in which the SQL interpreter is expressed is also not an important aspect of the invention, so long as a specializer for this IL's grammar is present in computer 10 (for use in generation of machine code).

In embodiments wherein the IL form (rather than "C" language form) of SQL interpreter is received in act 211, build computer 30 invokes a C language preprocessor first on the C language source code for the SQL interpreter, to pull any necessary RDBMS declarations into a source file. In situations where the C language source code for the SQL interpreter accesses global variables or calls external functions, the addresses of the global variables and external functions may be manually changed ahead of time in build computer 30 by a human developer, and passed via explicit function arguments. Moreover, a human developer may avoid blowing up the number of function arguments, by grouping multiple external addresses into one or more "call interfaces". A call interface is an array of typed pointers to global variables and functions.

In some embodiments, the human developer manually documents, in build computer 30, one or more arguments of one or more C functions (e.g. by writing comments in the source code of a SQL interpreter) as being one of two, namely: constant and mutable (changeable). In such embodiments, any part of the call interface identified as constant is declared as invariant during conversion of the C language source code of the SQL interpreter into IL by build computer 30 (and all access to the constant call interface is fully in-lined and constant-propagated). For example, a human developer may manually annotate an argument of a C function in a SQL interpreter as constant, by pre-pending (or alternatively appending) a predetermined text string, e.g. the string "DBMS_SPECIALIZER_CONST" as illustrated in Subsection A located below, just before the claims. Subsection A is an integral part of this detailed description and is incorporated by reference herein in its entirety.

Any arguments that are known to be constant may be automatically used by specializer 253 in performing act 121 of some embodiments, e.g. to optimize an annotated function in the SQL interpreter to obtain an optimized function, followed by additional optimizations that become possible due to presence of the optimized function. Such optimizations may be done in specializer 253 by application of any technique that will be readily apparent in view of this detailed description, such as code inlining, dispatch through constant pointers to functions, taking constant branches based on constant conditional expressions, constant folding, constant propagation, copy propagation, partial redundancy elimination, dead code elimination, and peephole optimization.

Therefore, a specializer for a C language program may be modified to use annotations in the source code (of function arguments being constant) to automatically discover opportunities to perform specialization, e.g. based on heuristics. For example, specializer 253 may be programmed to eliminate certain load instructions from an SQL interpreter, e.g. instructions to be used to load arguments that are known to be constant. As another example, specializer 253 may be programmed to eliminate certain branch instructions that depend only on arguments known to be constant. As yet another example, specializer 253 may be programmed to unroll certain loops wherein the iterations are bounded by a maximum number of arguments that are known to be constant (see FIG. 7 and related description below). Furthermore, specializer 253 may be programmed to treat all arguments stored in cursor 257 (FIG. 2B) as constants.

Depending on the embodiment, specializer 253 may be programmed to identify and eliminate instructions that impose two or more types of interpretive overhead as follows: (1) implementation-independent overhead and (2) implementation-dependent overhead. Two examples of implementation-independent overhead are illustrated in FIGS. 4A-4G and FIGS. 6A-6B and their elimination can be performed by specializing any implementation of an SQL interpreter (e.g. Oracle Database, Microsoft SQL, and IBM DB2). In addition, as will be readily apparent to the skilled artisan in view of this detailed description, similar specialization opportunities may be used to eliminate implementation-dependent overhead.

An example of implementation-dependent overhead is as follows. An argument of a function in IL code 252 of SQL interpreter may be of several different types, such as a column of a table in the relational database, or a constant, or an operator, and depending on the argument's type the function may use different data structures and software, and such use may require different computations of memory addresses. Depending on the implementation of the SQL interpreter, one or more (or in some cases all) inputs of one or more address computations may be known at the time of specializing the SQL interpreter, and if so such address computations are performed in operation 120 (instead of being performed in operation 130), thereby to eliminate implementation-dependent overhead.

In some embodiments, the source code in C language for a SQL interpreter in build computer 30 is fully self-contained, i.e. does not reference any global variables or external functions that can prevent or otherwise interfere with generation of machine code by database server 10. Therefore, build computer 30 uses a C language parser to create IL form 252 as well as the machine language form 251 using the just-described C language form of such a SQL interpreter.

The IL form 252 of SQL interpreter, which is generated by build computer 30 is eventually received in act 211 by computer 10, and accordingly it is this IL code 252 that is specialized in operation 120 by use of the SQL statement and/or database schema as constant. During such specialization, specializer 253 (FIG. 2B) executed by computer 10 may be programmed to eliminate two types of overhead that arise in interpretation of SQL statements as discussed above. The result of optimization in act 121 (FIG. 2A) is a residual program that is typically, but not necessarily, expressed in the intermediate language (same IL as the SQL interpreter).

Next, in act 122 (FIG. 2A), computer 10 locally generates and store to memory 1106 (and/or to storage device 1110), at least a portion of machine code that is directly executable by one or more processors of computer 10, by compilation of the residual program output by act 121. Specifically, the machine code (also called "specialized" machine code) 255MC (FIG. 2B) that is generated in act 122 (FIG. 2A) conforms to the instruction set architecture (ISA) of one or more processors 1105A, 1105B in computer 10. Hence, in some embodiments, the machine code 255MC output by act 122 is not further converted or translated prior to its execution. Instead, the machine code 255MC generated by act 122 is directly executed in hardware, e.g. in operation 130. Of note, the same computer 10 that generates specialized machine code (i.e. machine code generated locally in act 122), also executes that specialized machine code, as described below in reference to operation 130. As noted at the beginning of this paragraph, the specialized machine code is stored (e.g. in a memory or on disk) during act 122, and then its existence is checked in future iterations of act 112 (in response to receipt of the same SQL statement) and on being found in computer 10, the yes branch is taken from act 112 to operation 130 (i.e. skipping operation 120).

After performance of act 121, computer 10 performs operation 130 to execute the specialized machine code 255MC generated and stored by act 122 (described above). In executing specialized machine code 255MC in act 131, computer 10 avoids some interpretive overhead, by avoiding certain instructions, certain loads, certain branches, and/or certain jumps in the received code that are omitted by optimization in act 121 (described above). Depending on the embodiment, execution of specialized machine code 255MC in act 131 may be in combination with execution in act 132 of one or more portions of the machine code 251 of the SQL interpreter received in act 211. For example, a low-level function that is used to access data in an RDBMS table in relational database 12 (FIG. 3A) may be unchanged and shared across the two modes of RDBMS 100, namely execution of specialized interpreter in operation 130 and execution of received interpreter in operation 220.

Figure 3:
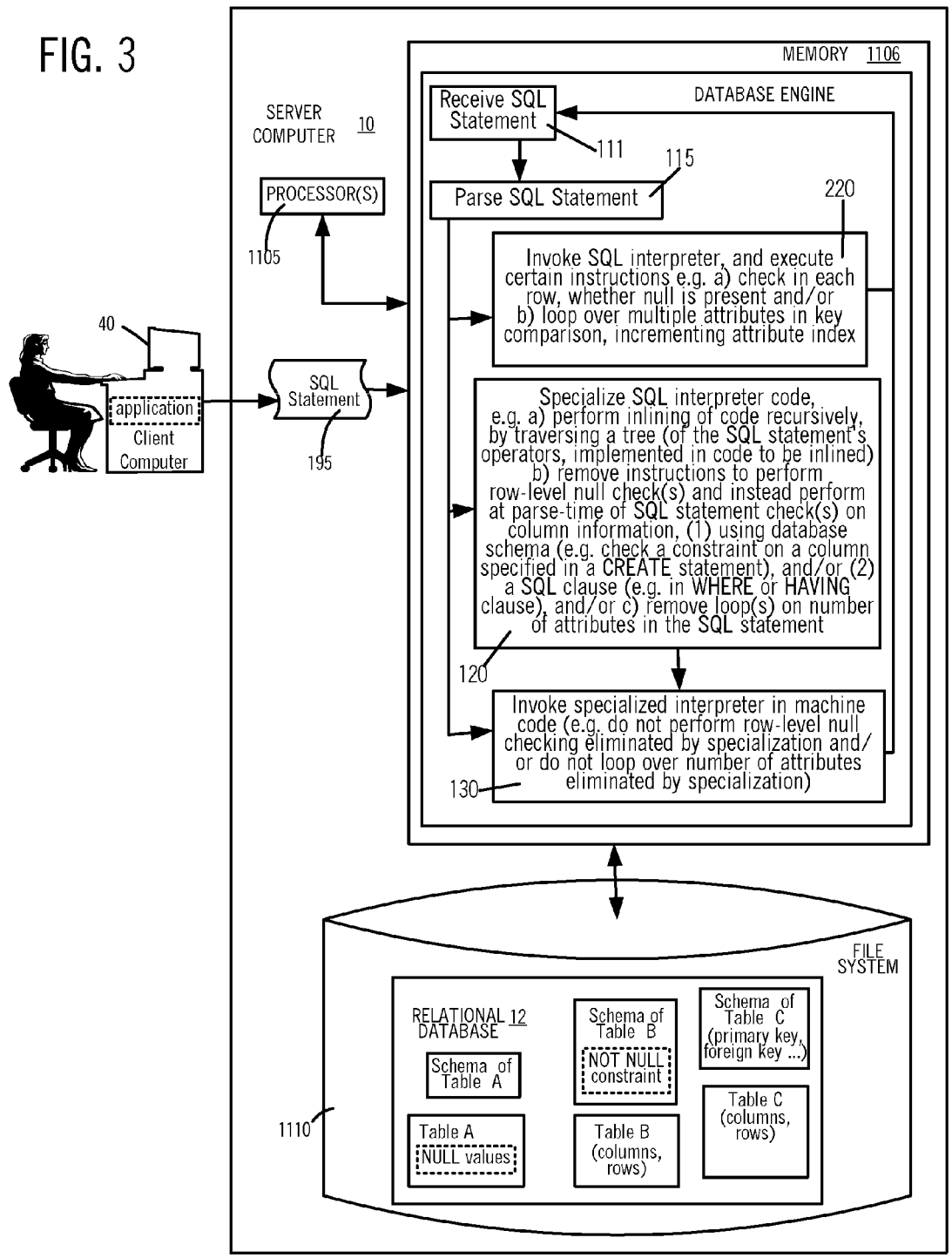
FIG. 3 illustrates, in another block diagram, a method similar to the methods of FIGS. 1 and 2, shown with tables and schema in a relational database 12, and further detail on operations 220, 120 and 130 in certain embodiments.

Typically, an RDBMS table A may include nulls of the type supported in any SQL-compliant relational database 12 (FIG. 3). Hence, invocation in act 220 (FIG. 3) of an SQL interpreter received in binary form involves performance of one or more operation(s) of null checking while processing each row, when executing a database statement. Such null checking operations are performed in act 220 even in certain situations wherein a column of the RDBMS table B is known (as per database schema) to not have any nulls, e.g. if a not null constraint was specified on that column during creation of table B.

A not null constraint is typically stored in the schema of table B (FIG. 3) in relational database 12 and therefore available for checking during specialization in act 120 (FIG. 3). Hence, in some embodiments of the type described herein, specialization in operation 120 includes removing instructions that perform row-level null checking, and instead at parse-time of the SQL statement one or more checks are performed on column information in the table's schema. Specifically, some embodiments of computer 10 are programmed to check for existence of a not null constraint on a column of a table, in the corresponding schema stored in database 12.

Alternatively or additionally, a clause in the SQL statement (e.g. WHERE clause or HAVING clause) may also be checked by computer 10 during operation 120 for a condition requiring the data being selected by the SQL statement to be not null. If a not null constraint or a not null condition is found, the corresponding not null checking instructions are removed in operation 120, and therefore these not null checks (which have been removed) are not performed in operation 130.

Moreover, the SQL interpreter may iterate, in operation 220, over one or more loops within each row, e.g. based on the number of attributes to be used in comparing multi-attribute keys, in sort operations or join operations. Accordingly, computer 10 may be programmed to perform operation 120 (FIG. 3) to unroll one or more loops, based on constant information in the SQL statement, e.g. the number of attributes to be used in comparing multi-attribute keys, in sort or join operations.

Figure 4D:
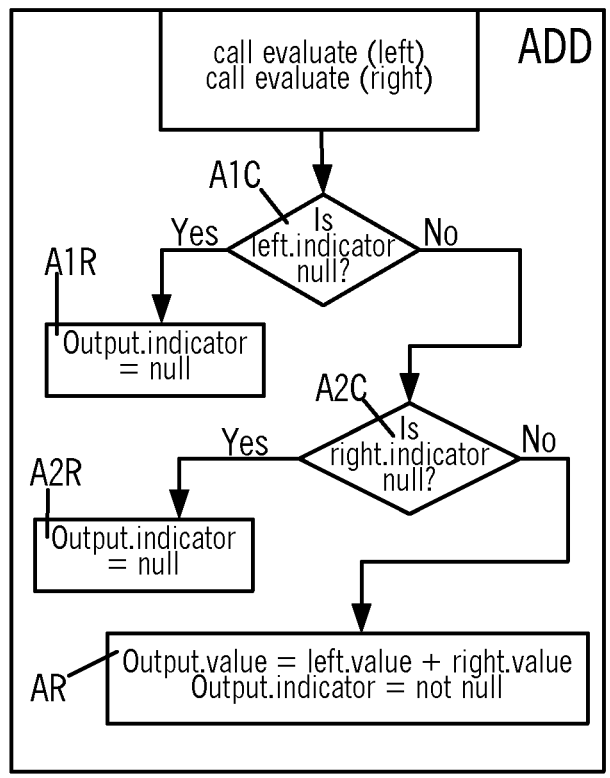
FIGS. 4D and 4E illustrate, in flow charts, an ADD function and an SUB function that are invoked by the SQL interpreter of FIG. 4C in the prior art.
Figure 4E:
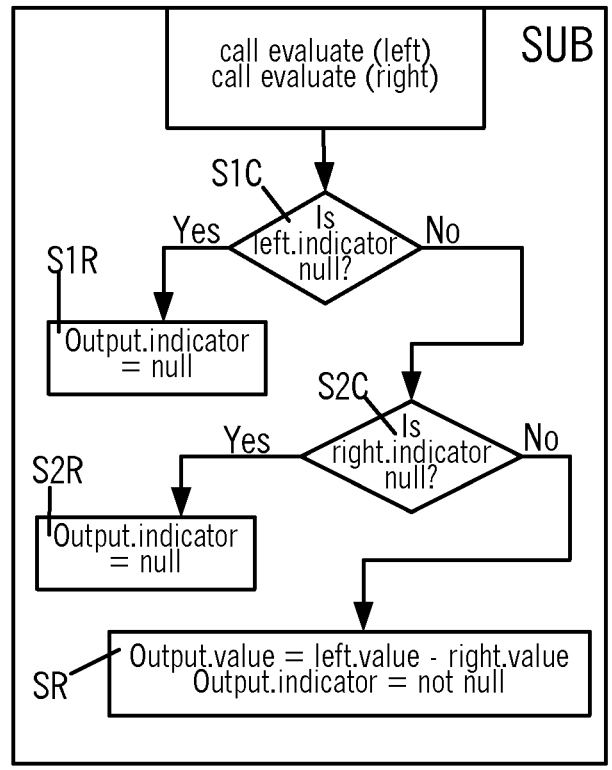

FIG. 4A illustrates a textual form of an SQL statement of the prior art that may be parsed to construct a tree 400 of the type shown in FIG. 4B. The parsed SQL statement's tree 400 shown in FIG. 4B can be executed as shown in FIG. 4C, by act 411 recursively invoking an appropriate one of functions ADD and SUB (starting with operator "+" in the topmost node 401 of expression tree 400 in FIG. 4B). Functions ADD and SUB invoked in FIG. 4C, are respectively illustrated in FIGS. 4D and 4E, and contain several steps to check for nulls. The null checks (e.g. in A1C and A2C in ADD, and in S1C and S2C in SUB) can be eliminated during interpreter specialization in operation 120 in accordance with the invention, if it is known that a not null constraint is specified on an attribute in the SQL statement, e.g. specified in the schema of a database (e.g. by a create statement illustrated in FIG. 4F), or specified in the SQL statement (e.g. see FIG. 4G).

Figure 5A:
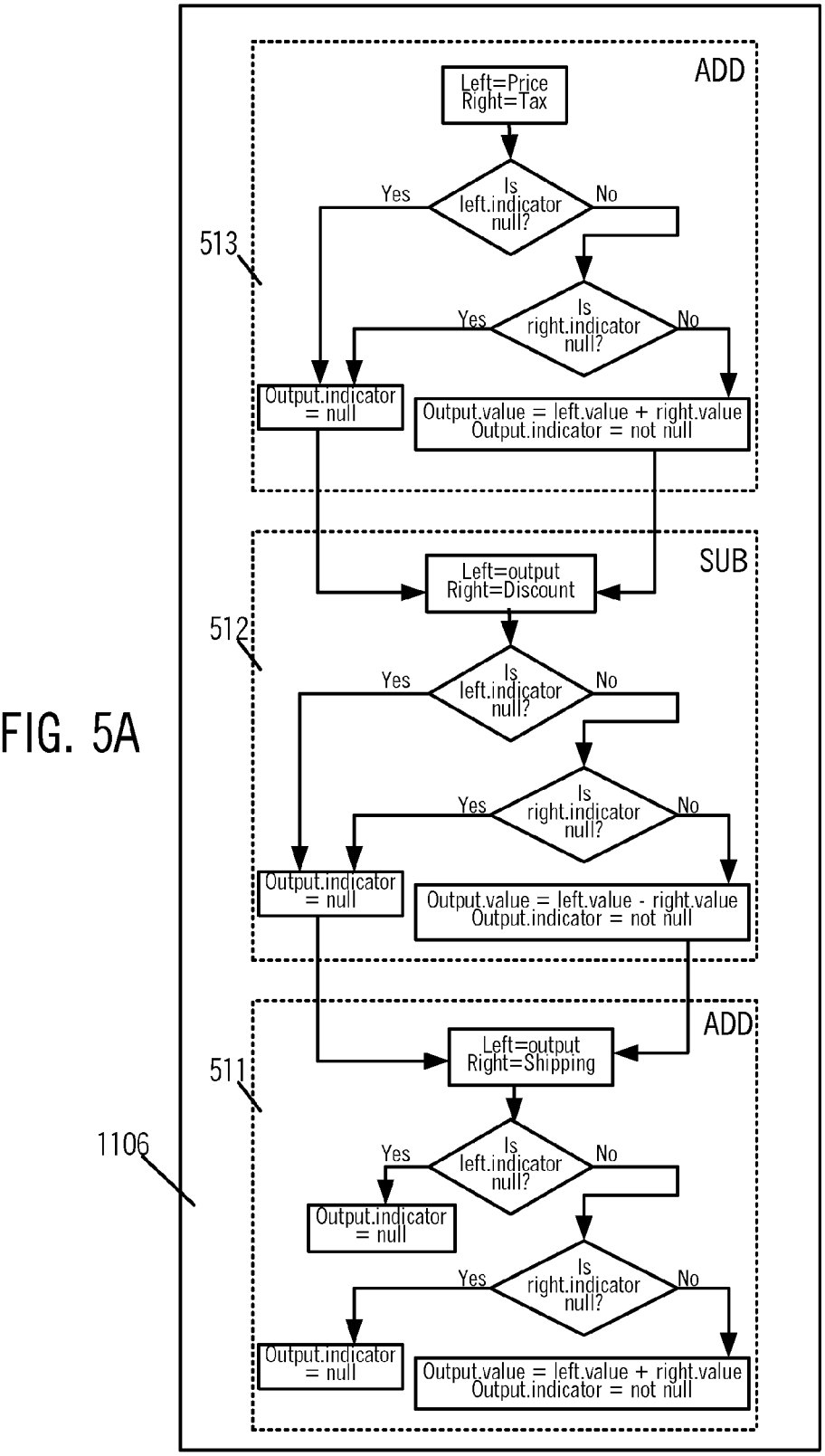
FIG. 5A illustrates, in a high-level flow chart, a residual program for evaluation of an expression in the SQL statement of FIG. 4A, obtained by in-lining ADD and SUB functions, in several embodiments of the invention.

FIG. 5A illustrates, in a high-level flow chart, a residual program for evaluation of an expression in the SQL statement of FIG. 4A, obtained by recursively in-lining the ADD and SUB functions (see FIGS. 4D and 4E), in several embodiments of the invention. In such embodiments, the SQL statement of FIG. 4A may be initially parsed in act 115 to obtain and store in memory 1106, the operator tree 400 shown in FIG. 4B. Subsequently, in performing act 121, computer 10 inlines a first instruction of function ADD for topmost node 401 in operator tree 400. Next, computer 10 specializes function evaluate, by using the constant pointer as an index into a vector of procedure addresses, e.g. CALL PROCEDURE_VECTOR (NODE.TYPE). Then, computer 10 inlines the first instruction of function SUB for node 402. As the first instruction of function SUB is another call to the evaluate function, computer 10 now inlines the dispatcher of function evaluate on the left node 403. At this stage, as node 403 is a leaf node, computer 10 simply inlines the function ADD for node 403 and returns to inlining of the function SUB for node 402, specifically by inlining the second instruction of function SUB. On completion of inlining of function SUB for node 402, computer 10 returns to inlining of the function ADD for node 401, specifically by inlining the second instruction of function ADD.

Therefore, computer 10 prepares the residual program shown in FIG. 5A by recursively performing inlining of the functions ADD and SUB. In some embodiments, such functions are present in IL code 252 and may be called via pointers, wherein the pointers have constant values that depend on operators in the SQL statement (such as the + and − operators in FIG. 4A), wherein each operator is implemented at least partially in at least one of said functions. Although a tree of operators as shown in FIG. 4B is prepared for the SQL statement of FIG. 4A in some embodiments, certain alternative embodiments organize such operators (of an SQL statement) sequentially, e.g. using reverse polish notation. Therefore, in the alternative embodiments, specializing in act 121 comprises unrolling a dispatch loop of such functions. Such loop unrolling will be readily apparent to the skilled artisan in view of this detailed description, e.g. see FIG. 7 and related description below, in reference to elimination of (a) incrementing loop index i and (b) checking loop index i against limit N.

Figure 5B:
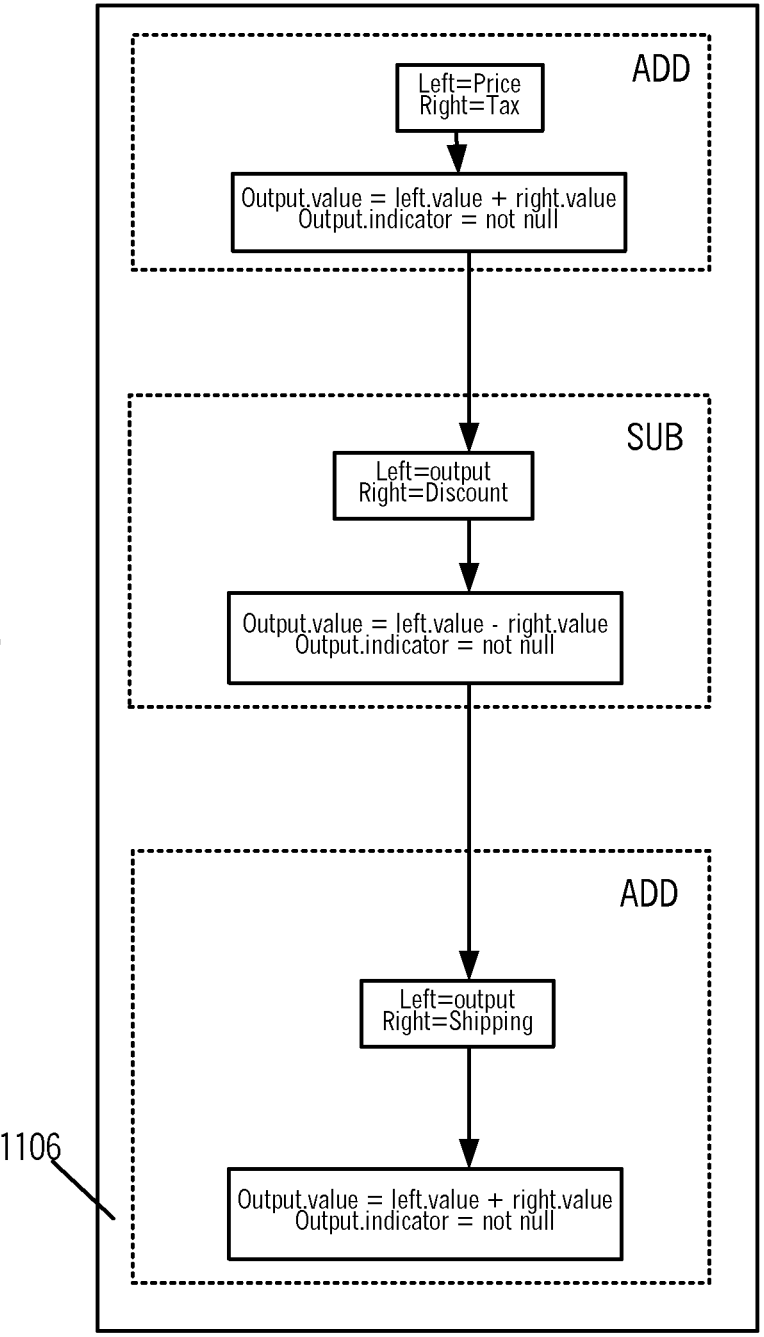
FIG. 5B illustrates, in a low-level flow chart, the residual program of FIG. 5A after elimination of null checking, for use when columns in the SQL statement have non null constraints, in some embodiments of the invention.

As shown in FIG. 5A, several operations of null checking are present throughout the residual program. Several embodiments of computer 10 determine, during interpreter specialization in operation 120 that all the operands in the expression tree occur in columns with not null constraints specified in their corresponding schema in database 12, and hence such null checking operations are eliminated as shown in FIG. 5B.

Figures 6A, 6B:
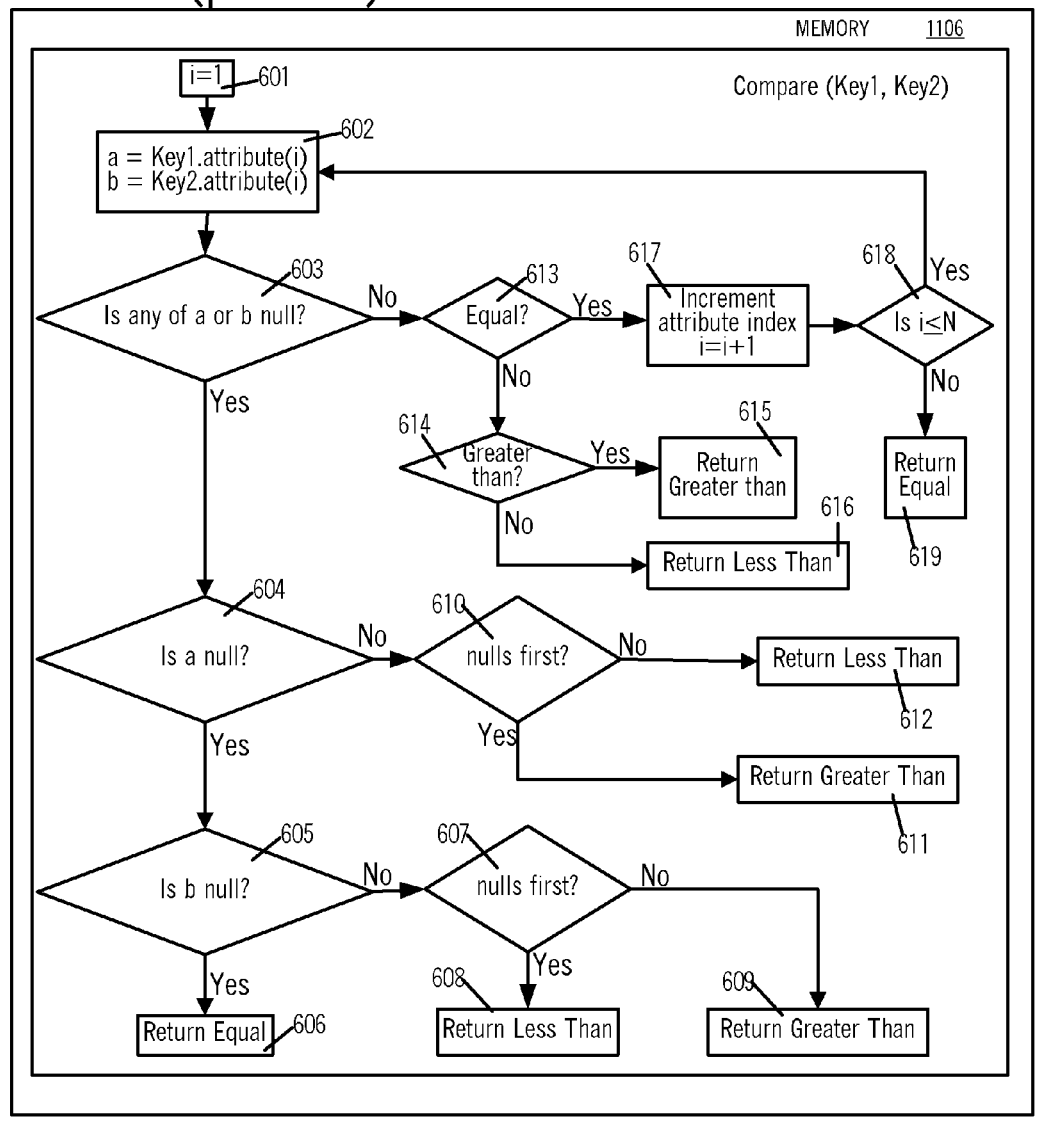
FIG. 6A illustrates yet another SQL statement, to retrieve data from a relational database of the prior art.
FIG. 6B illustrates, in a flow chart, steps of a key compare routine used in execution of the SQL statement of FIG. 6A by an SQL interpreter of the prior art.

FIG. 6A illustrates an SQL statement, to retrieve data from a relational database of the prior art. Execution of the SQL statement of FIG. 6A using an SQL interpreter of the prior art invokes a key compare routine shown in FIG. 6B. Such a key compare routine may be a building block of any sort algorithm, such as quick sort, bubble sort, heap sort etc. Depending on how the sorting is done, the key compare routine of FIG. 6B can be invoked different number of times, with different keys. A lower bound on the number of times key compare routine can be invoked is nlogn.

In the key compare routine of FIG. 6B, an index "i" for a loop that ranges up to a maximum number of attributes ("attribute index") is initialized to 1 in step 601 followed by step 602. In step 602 arguments "a" and "b" are initialized, followed by step 603. Steps 603-611 are used to perform null checking of the arguments "a" and "b" of the compare function. When either of the two arguments "a" and "b" is null, then steps 613 and 614 are performed to check whether the two arguments are equal to one another, and if not then which of the two arguments is greater. When one of the two arguments is greater, then an appropriate result is returned by acts 615 and 616. When the arguments are equal, an act 617 is performed to increment the attribute index i, thereby to go from identifying HireDate as the current attribute to identifying Salary as the current attribute, for example. In act 618 an upper limit N on the number of attributes is checked, followed by returning to act 602.

When an SQL statement of the type shown in FIG. 6A is received by RDBMS 100, the number of attributes is known, and it is also known that the arguments are not null. Hence, in operation 120, specializer 253 automatically specializes the key compare routine by removing steps 603-611 shown in FIG. 6B to perform null checking. Also, note that specializer 253 uses a known upper limit N on the number of attributes (in this example, two attributes) to unroll a loop, e.g. (a) to omit act 617 to increment the attribute index i, and (b) further omit act 618 to check if an upper limit N on the attribute index i has been reached. Such specialization of the key compare routine is independent of the sort algorithm that calls the key compare routine.

Figure 7:
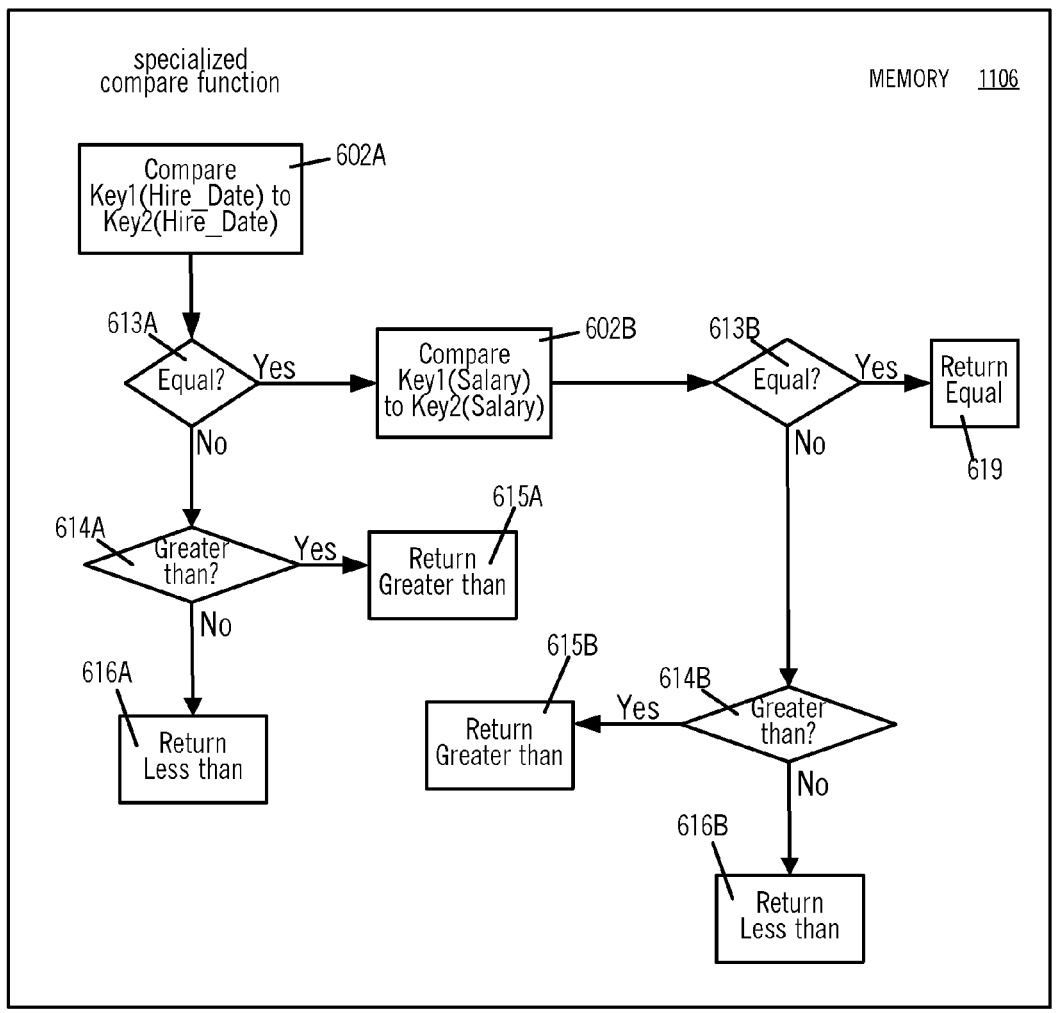
FIG. 7 illustrates, in a flow chart, steps of the key compare routine of FIG. 6B after elimination of null checking and elimination of incrementing of attribute index, for use in some embodiments of the invention.

In operation 120 for the key compare routine of FIG. 6B, specializer 253 creates two sets of instructions by the loop unrolling described above, namely the acts that are labeled with the suffix "A" and the acts that are labeled with the suffix "B" respectively, as illustrated in FIG. 7. The reference numerals shown in FIG. 7 are derived from corresponding reference numerals shown in FIG. 6B, by adding a suffix "A" for the first attribute (e.g. HireDate) and "B" for the second attribute (e.g. Salary). As soon as specializer 253 finishes creation of the IL code for the acts shown in FIG. 7, the IL code is translated into machine code (in act 122).

Note that the above-described elimination of null checking operations and loop unrolling are just two examples of numerous such specializations that can be performed with an SQL statement and database schema as constant. Hence, several different implementations of specializer 253 will be readily apparent to the skilled artisan in view of this detailed description. For additional details on implementation of specializer 253, see for example, the description in a paragraph above, in reference to First Futamura Projection and Partial Evaluation. Therefore, a specific manner in which specializer 253 is implemented can be different, depending on the embodiment of the invention.

The methods of FIGS. 1, 2A and 3 may be used to program a computer 10 of the type illustrated in FIG. 8A which is discussed next. Specifically, computer 10 includes a bus 1102 (FIG. 8A) or other communication mechanism for communicating information, and one or more processors 1105A, 1105B coupled with bus 1102 for processing information. Computer 10 uses a main memory 1106, such as a random access memory (RAM) or other dynamic storage device, coupled to bus 1102 for storing information and instructions (e.g. for the method of FIG. 1) to be executed by processors 1105A, 1105B (which is included in computer 10 of FIG. 1).

Main memory 1106 also may be used for storing temporary variables or other intermediate information (e.g. software shown in FIG. 3B) during execution of instructions to be executed by processors 1105A, 1105B. Computer system 10 further includes a read only memory (ROM) 1104 or other static storage device coupled to bus 1102 for storing static information and instructions for processors 1105A, 1105B, such as enterprise software 200. A storage device 1110, such as a magnetic disk or optical disk, is provided and coupled to bus 1102 for storing information and instructions.

Computer system 10 may be coupled via bus 1102 to a display device or video monitor 1112 such as a cathode ray tube (CRT) or a liquid crystal display (LCD), for displaying information to a computer user, e.g. the content parts 231 and 251 may be displayed on display 1112. An input device 1114, including alphanumeric and other keys (e.g. of a keyboard), is coupled to bus 1102 for communicating information to processors 1105A, 1105B. Another type of user input device is cursor control 1116, such as a mouse, a trackball, or cursor direction keys for communicating information and command selections to processors 1105A, 1105B and for controlling cursor movement on display 1112. This input device typically has two degrees of freedom in two axes, a first axis (e.g., x) and a second axis (e.g., y), that allows the device to specify positions in a plane.

As described elsewhere herein, RDBMS 100 is implemented by computer 10 in response to processors 1105A, 1105B executing one or more sequences of one or more instructions that are contained in main memory 1106. Such instructions may be read into main memory 1106 from another computer-readable storage medium, such as storage device 1110. Execution of the sequences of instructions contained in main memory 1106 causes processors 1105A, 1105B to perform the operations of a process described herein and illustrated in FIG. 1. In alternative embodiments, hard-wired circuitry may be used in place of or in combination with software instructions to implement the invention. Thus, embodiments of the invention are not limited to any specific combination of hardware circuitry and software.

The term "computer-readable non-transitory storage medium" as used herein refers to any non-transitory storage medium that participates in providing instructions to processors 1105A, 1105B for execution. Such a non-transitory storage medium may take many forms, including but not limited to (1) non-volatile storage media, and (2) volatile storage media. Common forms of non-volatile storage media include, for example, a floppy disk, a flexible disk, hard disk, optical disk, magnetic disk, magnetic tape, or any other magnetic medium, a CD-ROM, any other optical medium, punch cards, paper tape, any other physical medium with patterns of holes, a PROM, and EPROM, a FLASH-EPROM, any other memory chip or cartridge that can be used as storage device 1110. Volatile storage media includes dynamic memory, such as main memory 1106 which may be implemented in the form of a random access memory or RAM.

In addition, instructions to processors 1105A, 1105B can be provided by a transmission link or by a non-transitory storage medium from which a computer can read information, such as data and/or code. Specifically, various forms of transmission link and/or non-transitory storage media may be involved in providing one or more sequences of one or more instructions to processors 1105A, 1105B for execution. For example, the instructions may initially be comprised in a non-transitory storage device, such as a magnetic disk, of a remote computer. The remote computer can load the instructions into its dynamic memory (RAM) and send the instructions over a telephone line using a modem.

A modem local to computer 10 can receive information about a change to software on the telephone line and use an infra-red transmitter to transmit the information in an infra-red signal. An infra-red detector can receive the information carried in the infra-red signal and appropriate circuitry can place the information on bus 1102. Bus 1102 carries the information to main memory 1106, from which processors 1105A, 1105B retrieve and execute the instructions. The instructions received by main memory 1106 may optionally be stored on storage device 1110 either before or after execution by processors 1105A, 1105B.

Computer 10 also includes a communication interface 1115 coupled to bus 1102. Communication interface 1115 provides a two-way data communication coupling to a network link 1120 that is connected to a local network 1122. Local network 1122 may interconnect multiple computers (as described above). For example, communication interface 1115 may be an integrated services digital network (ISDN) card or a modem to provide a data communication connection to a corresponding type of telephone line. As another example, communication interface 1115 may be a local area network (LAN) card to provide a data communication connection to a compatible LAN. Wireless links may also be implemented. In any such implementation, communication interface 1115 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1125 or to data equipment operated by an Internet Service Provider (ISP) 1126. ISP 1126 in turn provides data communication services through the world wide packet data communication network 1124 now commonly referred to as the "Internet". Local network 1122 and network 1124 both use electrical, electromagnetic or optical signals that carry digital data streams. The signals through the various networks and the signals on network link 1120 and through communication interface 1115, which carry the digital data to and from computer 10, are exemplary forms of carrier waves transporting the information.

Computer 10 can send messages and receive data, including program code, through the network(s), network link 1120 and communication interface 1115. In the Internet example, a computer 1100 might transmit information through Internet 1124, ISP 1126, local network 1122 and communication interface 1115. The instructions for performing the operations of FIG. 1 may be executed by processors 1105A, 1105B as they are received, and/or stored in storage device 1110, or other non-volatile storage for later execution. In this manner, computer 10 may additionally or alternatively obtain instructions and any related data in the form of a carrier wave.

Figure 8A:
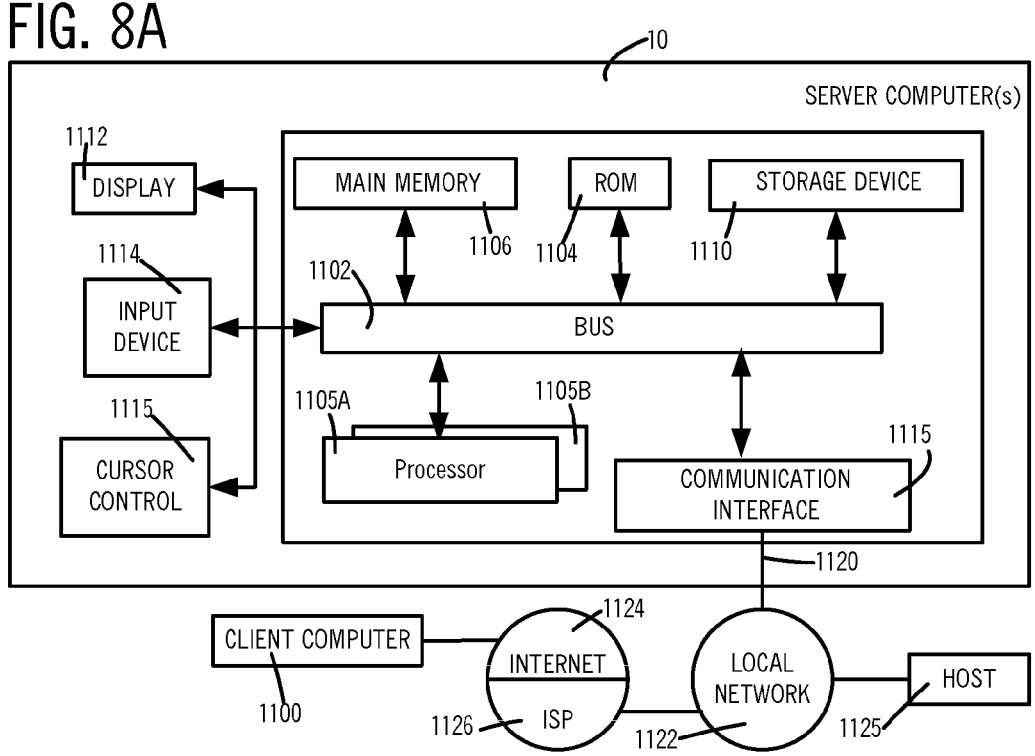
FIGS. 8A and 8B illustrate, in block diagrams, hardware and software portions of a server computer of the type illustrated in FIGS. 1, 2A, 3, 5B and 7 in some embodiments of the invention.
Figure 8B:
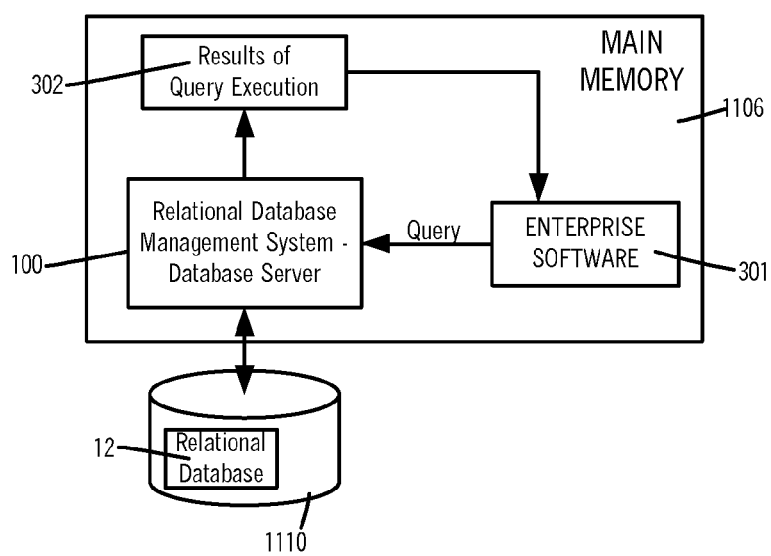

Note that FIG. 8A is a very low-level representation of many hardware components of a computer system. Several embodiments have one or more additional software components in main memory 1106 as shown in FIG. 8B. Specifically, in such embodiments, computer 10 of FIG. 8A implements a relational database management system 1905 of the type illustrated in FIG. 8B. Relational database management system 1905 may manage a distributed database system that includes multiple databases, each database being stored on different storage mechanisms.

In some embodiments, the multiple databases are made to appear to computer 10 as a single database. In such embodiments, an application 1903 can access and modify the data in a database 12 via RDBMS 1905 that accepts queries in conformance with a relational database language, the most common of which is the Structured Query Language (SQL). The commands are used by application 1903 of some embodiments to store, modify and retrieve data in the form of rows in a RDBMS table in database 12. Relational database management system 1905 further includes an output logic that makes the data in database 12 available to a user via a graphical user interface that generates a display on a video monitor 1112. In one example, the output logic provides results via a web-based user interface that depicts information related to layout structures in documents. Additionally and/or alternatively, a database-centric screen is responsive to a command in a command-line interface and displays on a video monitor text information on layout structures.

Numerous modifications and adaptations of the embodiments described herein will become apparent to the skilled artisan in view of this disclosure.

Numerous modifications and adaptations of the embodiments described herein are encompassed by the scope of the invention.

What is claimed is:

1. A method of using a computer, the method comprising:
   receiving a database statement to be executed by a database management system;
   in response to at least receipt of the database statement, checking whether a specialized interpreter for the database statement is available;
   if a specialized interpreter for the database statement is available, the computer invoking the specialized interpreter to execute the database statement; and
   if a specialized interpreter for the database statement is not available, the computer checking whether a predetermined condition is met;
   if the predetermined condition is not met, invoking an SQL interpreter to execute the database statement; and
   if the predetermined condition is met:
      specializing an SQL interpreter for the database statement, to create a specialized interpreter;
      storing in a memory of the computer, at least a portion of the specialized interpreter obtained by the specializing; and
      invoking the specialized interpreter obtained by the specializing, to execute the database statement.

2. The method of claim 1 wherein:
   the SQL interpreter comprises a plurality of functions; and
   the specializing comprises recursively performing inlining.

3. The method of claim 1 wherein:
   the SQL interpreter comprises a plurality of functions; and
   the specializing comprises unrolling a dispatch loop.

4. The method of claim 1 wherein a residual program is obtained during the specializing and the specializing further comprises:
   the computer using the residual program to generate machine code directly executable by one or more processors in the computer;
   wherein the specialized interpreter comprises the machine code.

5. The method of claim 4 wherein:
   the invoking comprises the one or more processors executing the machine code; and
   the database statement is executed without execution of at least one instruction eliminated by the specializing.

6. The method of claim 1 wherein:
   the specializing comprises partial evaluation of the SQL interpreter using the database statement as constant.

7. The method of claim 1 wherein:
   the invoking comprises accessing data from at least one of memory or disk in the computer;
   wherein the data is comprised in a database table identified in the database statement;
   wherein the database table is comprised among a plurality of tables of a relational database;
   wherein each table in the plurality of tables comprises a plurality of columns identifying a corresponding plurality of attributes;
   wherein each table in the plurality of tables comprises a plurality of rows with each row therein being uniquely identified by a primary key attribute; and
   wherein at least one row in the database table is related by a foreign key attribute to another row in another table in the plurality of tables.

8. The method of claim 1 further comprising:
   receiving the SQL interpreter in at least two forms;
   wherein a first form of the SQL interpreter is expressed in a binary language specific to the computer;
   wherein a second form of the SQL interpreter is expressed in a language other than the binary language; and
   wherein the SQL interpreter in each of the two forms is derived from a common source code.

9. The method of claim 1 wherein:
   invoking of said SQL interpreter prior to the specializing is such that the database statement is executed in the SQL interpreter by performance of at least one operation which is subsequently eliminated by the specializing.

10. The method of claim 9 wherein:
    the at least one operation comprises row-level null checking.

11. The method of claim 9 wherein:
    the at least one operation is a join operation that comprises looping over a plurality of attributes by at least incrementing an attribute index.

12. One or more computer readable non-transitory storage media comprising a plurality of instructions to be executed by one or more processors in a computer, the plurality of instructions comprising:
    instructions to receive a database statement to be executed by a relational database management system;
    instructions responsive to at least receipt of the database statement, to check whether a specialized interpreter for the database statement is available;
    instructions, responsive to a specialized interpreter for the database statement being available, to invoke the specialized interpreter to execute the database statement;
    instructions, responsive to a specialized interpreter for the database statement being not available, to check whether a predetermined condition is met;
    instructions, responsive to the predetermined condition being not met, to invoke an SQL interpreter to execute the database statement;
    instructions, responsive to the predetermined condition being met, to:
       specialize an SQL interpreter for the database statement, to create a specialized interpreter;

store in a memory of the computer, at least a portion of the specialized interpreter obtained by execution of the instructions to specialize; and invoke the specialized interpreter obtained by execution of the instructions to specialize, to execute the database statement.

13. The one or more computer readable non-transitory storage media of claim 12 wherein:

the database statement is expressed in Structured Query Language (SQL).

14. The one or more computer readable non-transitory storage media of claim 12 wherein a residual program is obtained by execution of the instructions to specialize and the plurality of instructions further comprise:

instructions to use the residual program to generate machine executable native code executable by the one or more processors in the computer.

15. The one or more computer readable non-transitory storage media of claim 12 wherein:

the instructions to invoke comprise instructions to cause the one or more processors to execute the machine executable native code;

whereby the database statement is executed without execution of at least one instruction eliminated by execution of the instructions to specialize.

16. The one or more computer readable non-transitory storage media of claim 15 further comprising:

instructions to perform the at least one instruction eliminated by execution of the instructions to specialize, during an earlier invocation of the SQL interpreter without execution of the instructions to specialize.

17. The one or more computer readable non-transitory storage media of claim 12 wherein:

the instructions to invoke comprise instructions to access data from at least one of memory and disk in the computer;

wherein the data is comprised in a relational database table identified in the database statement;

wherein the relational database table is comprised among a plurality of tables of a relational database;

wherein each table in the plurality of tables comprises a plurality of columns identifying a corresponding plurality of attributes;

wherein each table in the plurality of tables comprises a plurality of rows with each row therein being uniquely identified by a primary key attribute;

wherein at least one row in the database table is related by a foreign key attribute to another row in another table in the plurality of tables.

18. The one or more computer readable non-transitory storage media of claim 12 further comprising:

instructions to receive the SQL interpreter in each of a plurality of languages;

wherein a first language in the plurality is a binary language specific to the computer;

wherein a second language in the plurality is other than the first language; and wherein the SQL interpreter in each of the plurality of languages is derived from a common source code.

19. The one or more computer readable non-transitory storage media of claim 18 wherein:

when the predetermined condition is not met, the SQL interpreter invoked is in the first language; and when the predetermined condition is met, the SQL interpreter specialized is in the second language.

20. An apparatus comprising one or more processors and a non-transitory memory, the non-transitory memory comprising software, the one or more processors being configured to perform a method comprising:

receiving a relational database query to be executed by a relational database management system;

responsive to at least receipt of the relational database query, checking whether a specialized interpreter is available for the relational database query;

responsive to a specialized interpreter for the database statement being available, invoking the specialized interpreter to execute the database statement;

responsive to a specialized interpreter for the database statement being not available, checking whether a predetermined condition is met;

responsive to the predetermined condition being not met, invoking an SQL interpreter to execute the database statement; and responsive to at least the predetermined condition being met:

specializing an SQL interpreter for the database statement, to create a specialized interpreter;

storing in a memory of a computer, at least a portion of the specialized interpreter obtained by the specializing; and invoking the specialized interpreter obtained by the specializing, to execute the database statement.

* * * * *

UNITED STATES PATENT AND TRADEMARK OFFICE
CERTIFICATE OF CORRECTION

PATENT NO. : 8,793,240 B2  
APPLICATION NO. : 13/219574  
DATED : July 29, 2014  
INVENTOR(S) : Potapov et al.

It is certified that error appears in the above-identified patent and that said Letters Patent is hereby corrected as shown below:

In the Specification

In column 2, line 58, delete "DMBS" and insert -- DBMS --, therefor.

Signed and Sealed this
Third Day of March, 2015

Michelle K. Lee
*Deputy Director of the United States Patent and Trademark Office*